United States Patent [19]
Takeshi et al.

[11] Patent Number: 6,038,068
[45] Date of Patent: *Mar. 14, 2000

[54] ABERRATION CORRECTION SYSTEM AND ASTRONOMICAL TELESCOPE HAVING THE SAME

[75] Inventors: Kunio Takeshi, Yokohama; Mikichi Ban, Miura; Yoshiya Matsui, Yokohama; Kyoji Nariai, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,213

[22] Filed: Feb. 19, 1997

Related U.S. Application Data

[63] Continuation of application No. 08/185,150, Jan. 24, 1994, abandoned.

[30] Foreign Application Priority Data

Jan. 29, 1993 [JP] Japan ................................. 5-034160

[51] Int. Cl.[7] .......................... G02B 23/00; G02B 17/00; G02B 27/64; G02B 25/00
[52] U.S. Cl. ......................... 359/399; 359/364; 359/433; 359/554; 359/557; 359/646; 359/726; 359/728
[58] Field of Search .................................. 359/727, 729, 359/731, 399, 364, 366, 557, 365, 554, 433, 646

[56] References Cited

U.S. PATENT DOCUMENTS

| | | | |
|---|---|---|---|
| 3,524,698 | 8/1970 | Brueggemann | 359/729 |
| 4,564,269 | 1/1986 | Uehara | 359/650 |
| 4,978,205 | 12/1990 | Sato | 359/557 |
| 5,177,605 | 1/1993 | Takahashi et al. | 348/65 |
| 5,182,671 | 1/1993 | Kitagishi et al. | 359/557 |

OTHER PUBLICATIONS

Seymour Rosin, Richey Chrétien Corrector System—Applied Optics, Apr. 1966, vol. 5, No. 4, pp. 675–676.
Su Ding–qiang, A New Type of Field Corrector, Astronomy and Astrophysics 156, Oct. 19, 1985, pp. 381–385.
Wang Ya–nan and Su Ding–qiang, Some New Lens–Prism Correctors for Prime Focus, Astronomy and Astrophysics 232, Nov. 3, 1989, pp. 589–602.

*Primary Examiner*—Cassandra Spyrou
*Assistant Examiner*—Audrey Chang
*Attorney, Agent, or Firm*—Fitzpatrick, Cella, Harper & Scinto

[57] ABSTRACT

An aberration correction system having a first lens disposed at an object side; and a second lens disposed at an image side, wherein the first and second lenses have different dispersions (Abbe numbers) with respect to each other, the surface of the object side of the first lens and the surface of the image side of the second lens which is adjacent to the image have substantially common center of curvature and the first and second lenses rotate around the center of curvature.

26 Claims, 8 Drawing Sheets

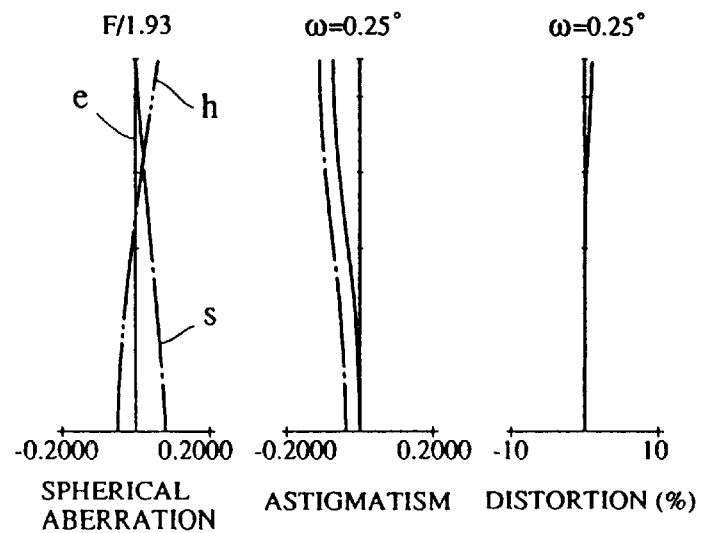
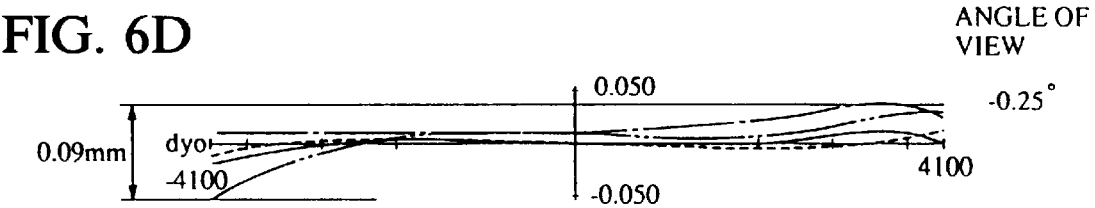
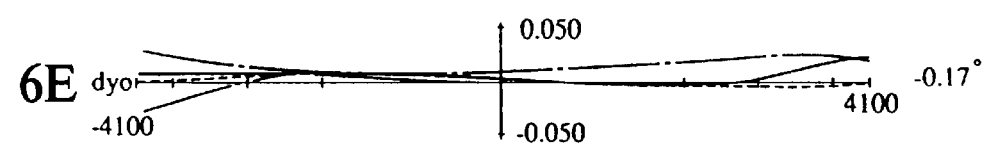
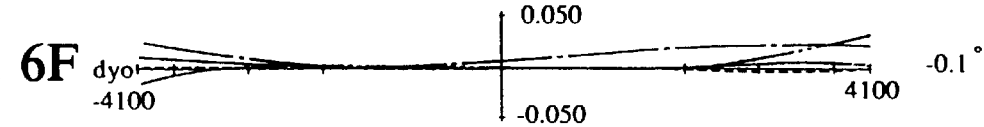
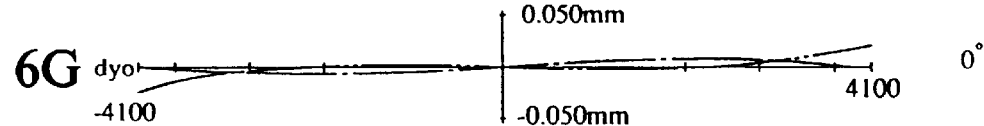
LATERAL ABERRATION

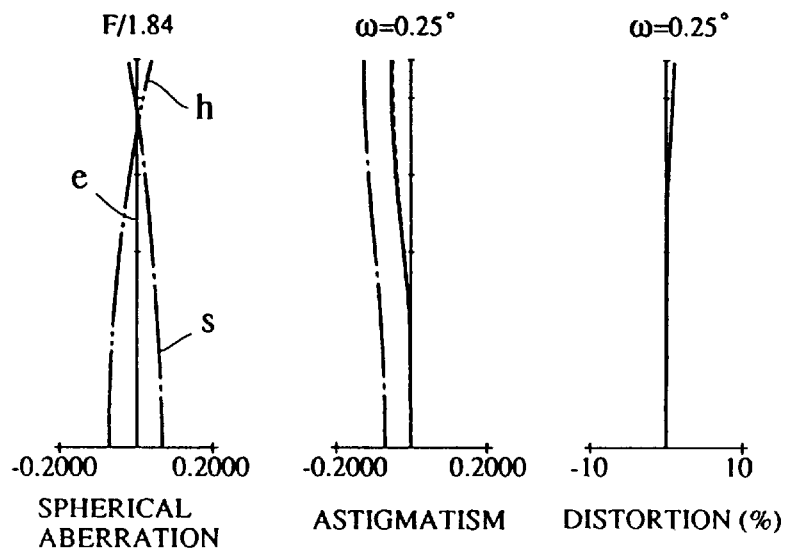
FIG. 7A  FIG. 7B  FIG. 7C
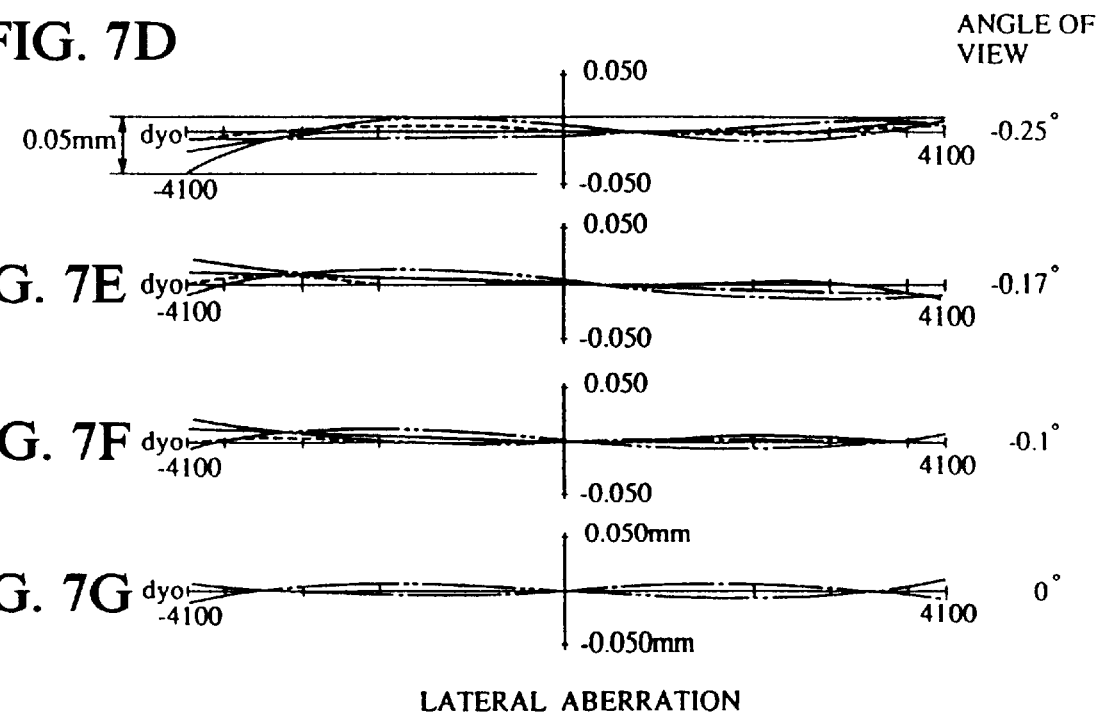

LATERAL ABERRATION

ABERRATION CORRECTION SYSTEM AND ASTRONOMICAL TELESCOPE HAVING THE SAME

This application is a continuation of application Ser. No. 08/185,150, filed Jan. 24, 1994, now abandoned.

BACKGROUND OF THE INVENTION

1. Field of the Invention

The present invention relates to an aberration correction system (refracting field corrector system) and an astronomical telescope for astronomical observation using the same, and more particularly to an aberration correction system arranged in such a manner that a prime focus corrector, which corrects an aberration of a reflecting mirror (a primary mirror) to widen the visual field of the prime focus, comprises a compound lens which corrects a deviation that occurs due to a difference in the wavelength of light of a star image caused from dispersion by the atmosphere that takes place when an observation is made at a point that is not the zenith. The present invention also relates to an astronomical telescope using the same to have a wide visual field and to be capable of observing a subject at an excellent resolution.

2. Description of the Prior Art

FIG. 1 is a schematic view which illustrates an optical system of a Cassegrain telescope. Referring to FIG. 1, the optical system is arranged in such a manner that a luminous flux from a star or the like in the celestial sphere transmitted in a direction from a left portion of FIG. 1 is reflected and condensed by a mirror 1 composed of a paraboloid and so forth as to be focused on a prime focus 3. Then, the luminous flux is allowed to pass through a secondary mirror 2 having a convex hyperboloid, and then it forms an image of an object (an image of a star) on a plane 4.

Although the Cassegrain telescope is used as a reflector having a large or an intermediate aperture, it encounters a problem that its large off-axis aberration excessively narrows the observation visual field.

On the other hand, a RC (Ritchey-Chretien) telescope is available which enables a wide angle of field to be obtained due to the fact that its structure is arranged in such a manner that the primary and secondary mirrors are each composed of aspheric surfaces near hyperboloids. The optical system of the RC telescope comprises an aplantic lens correcting a spherical aberration and a comatic aberration.

However, the RC telescope also enables a satisfactorily wide visual field to be obtained because it has a large amount of astigmatism. Furthermore, the fact that the primary mirror of the RC telescope has a concave hyperboloid, inhibits excellent focusing on the prime focus 3.

Accordingly, an astronomical observation with a wider visual field is enabled by an arrangement of the RC reflector made as shown in FIG. 2 such that a prime focus corrector system 100 for improving the imaging performance on to the prime focus of the primary mirror 1 is disposed in place of the secondary mirror (omitted from illustration). An observation point except the zenith, encounters a focusing position of light for each color that can be varied due to a difference in the index of refraction (so-called dispersion of the atmosphere) caused by the wavelength of the atmospheric layer surrounding the earth. Therefore the star image is divided into spectra, causing a problem to arise in that the observed image spreads vertically and accordingly the image quality deteriorates.

It might therefore be considered feasible to employ an optical member (an atmospheric dispersion corrector unit) for correcting an atmospheric dispersion in a portion of a prime focus corrector system 100 to prevent the deterioration of the image quality.

Referring to FIG. 2, reference numerals 5, 6 and 11 represent prime focus corrector lenses.

The structure shown in FIG. 2 has a small number of lenses, that is, three lenses in order to prevent generation of ghost and minimize the light quantity loss. Another structure has been considered which comprises a phosphate fluor crown glass to reduce chromatic aberration generated from the corrector system.

Reference numeral 101 represents an optical member for correcting atmosphere dispersion. The optical member 101 is composed of a pair of plane glass plates 101a and 101b each of which is formed by bonding two wedge-shape glass plates 7 and 8 and two wedge-shape glass plates 9 and 10. The glass plates 7 and 10 are crown glass plates, while the glass plates 8 and 9 are flint glass plates.

Reference numeral 12 represents a window member for a sensor such as a CCD for observing a focal plane. When an astronomical observation is performed, direct vision spectral prisms 101a and 101b are rotated around an optical axis in opposite directions in accordance with the amount of the atmosphere dispersion to correct the atmosphere dispersion.

The conventional aberration correction system has been arranged such that the conventional method for correcting the atmosphere dispersion is simply combined with the prime focus corrector system for correcting the aberrations caused from the primary mirror.

As a result, the size and the weight of the prime focus corrector system cannot be reduced, and accordingly a problem arises in that the prime focus corrector system cannot easily be handled when the observation focal position of a multi-purpose large-size telescope is changed over (for example, from Cassegrainian focal point to main focal point) in a usual manner. What is worse, the number of the optical elements increases, causing ghosts to be generated easily and light quantity loss cannot be prevented.

Su Ding-qiang et al. disclosed an optical element capable of correcting aberrations generated due to a primary mirror and chromatic deviation occurring due to atmosphere dispersion (Astron Astrophys., 156 381 (1986) and Astron Astrophys., 232 589 (1990)).

However, the foregoing optical element cannot satisfactorily correct both the aberration of the main mirror and the chromatic deviation occurring due to the atmosphere dispersion while reducing the overall size of the lens system.

SUMMARY OF THE INVENTION

An object of the present invention is to provide an aberration correction system capable of correcting an aberration of a main mirror and a chromatic deviation (aberration) occurring due to atmosphere dispersion while reducing the overall size of a lens system, and to provide an astronomical telescope using the aberration correction system.

An aberration correction system according to the present invention comprises a first lens disposed on an object side; a second lens disposed on an image side, wherein the first and second lenses have different dispersions (Abbe numbers) relative to each other, the surface of the object side of the first lens and the surface of the image side of the second lens adjacent to the image have a substantially common curvature center and the first and second lenses rotate around the curvature center.

An astronomical telescope according to the present invention comprises a reflecting mirror; and an aberration correction system for receiving a beam reflected by the reflecting mirror, the aberration correction system having a compound lens composed of a first lens disposed on an object side and a second lens disposed on an image side, wherein the compound lens is arranged in such a manner that the first lens and the second lens have different dispersions (Abbe numbers), the surface of the object side of the first lens and the surface of the image side of the second lens have substantially common curvature center and the first and second lenses rotate around the curvature center.

The aberration correction system and the astronomical telescope include aspects that the refractive index of refraction of the first lens and that of the second lens are substantially the same, that both the surface of the object side of the first lens and the surface of the image side of the second lens are plane surfaces, and that the first and second lenses are moved in a direction perpendicular to an optical axis. While having the foregoing aspects, the surface of the object side of the second lens and the surface of the image side of the first lens are bonded with an adhesive layer, or the surface of the object side of the second lens and the surface of the image side of the first lens are disposed adjacently while interposing an air layer.

The aberration correction system and the astronomical telescope include aspects that the refractive index of the first lens and that of the second lens are substantially the same, and that both of the surface of the object side of the first lens and the surface of the image side of the second lens are made of spherical surfaces. While having the foregoing aspects, the surface of the object side of the second lens and the surface of the image side of the first lens are bonded with an adhesive layer, or the surface of the object side of the second lens and the surface of the image side of the first lens are disposed adjacently while interposing an air layer.

Other and further objects, features and advantages of the invention will be appear more fully from the following description.

BRIEF DESCRIPTION OF THE DRAWINGS

FIGS. 6A–6G are graphs of various aberrations according to the first numerical example of the present invention;

FIGS. 7A–7G are graphs of various aberrations according to the second numerical example of the present invention.

DESCRIPTION OF THE PREFERRED EMBODIMENT

Figure 3:
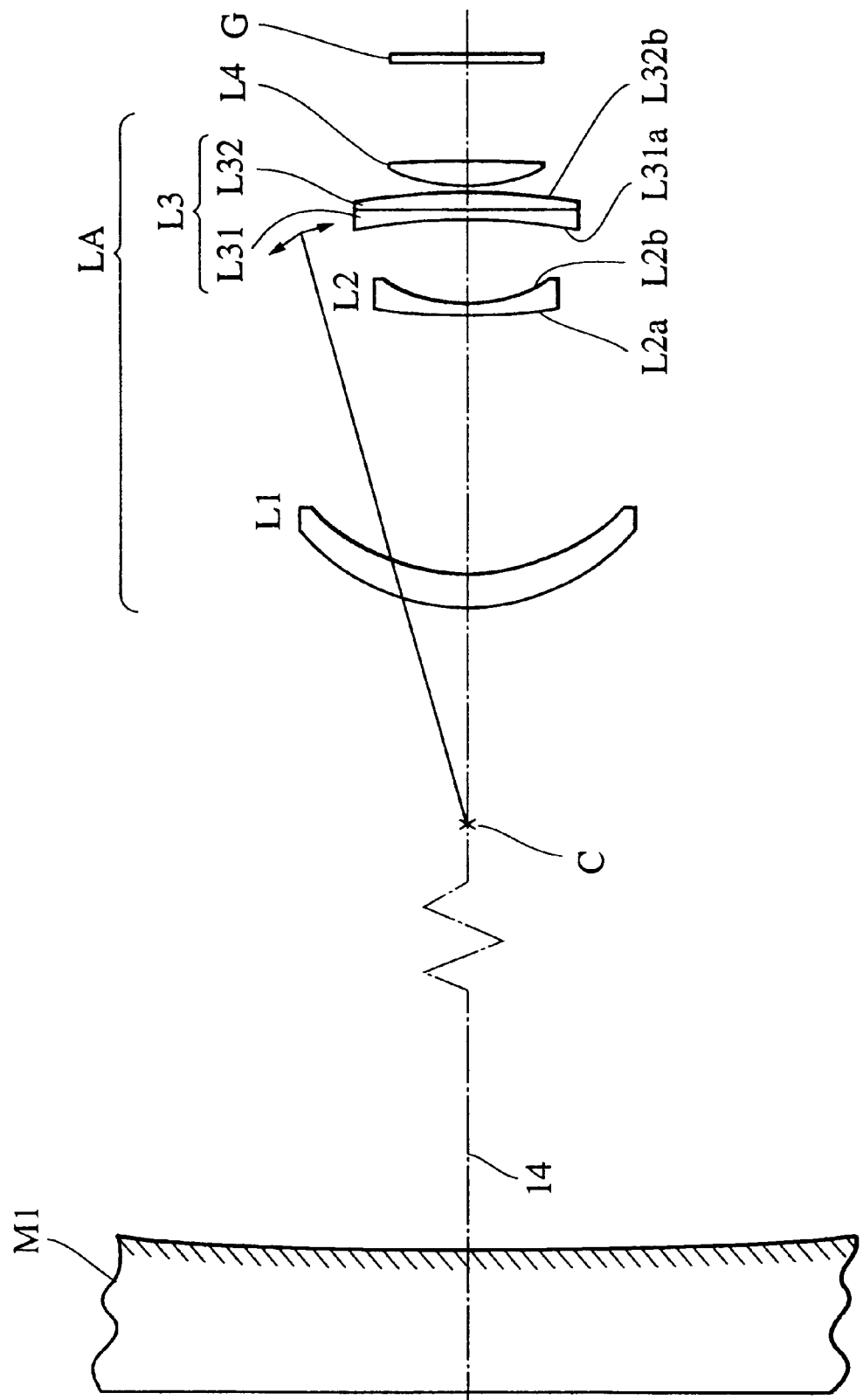
FIG. 3 is a schematic view which illustrates an essential portion of an optical system according to a first numerical example of the present invention.

FIG. 3 is a schematic view which illustrates an optical system of a first embodiment of the present invention. FIGS. 6A–6G are aberration graphs of the first embodiment of the present invention.

This embodiment is arranged in such a manner that an aberration correction system LA is disposed in place of a secondary mirror of a RC astronomical telescope comprising two axial symmetry reflecting mirrors composed of a primary mirror and the secondary mirror to widen the visual field for observation and correct for atmosphere dispersion. A beam from the celestial body is made incident from the right portion of FIG. 3.

The term "aberration correction system" used in the specification is meant as an optical system having a prime focus corrector system for correcting the aberrations generated due to the primary reflecting mirror and an atmosphere dispersion correction system for correcting a deviation of an image of a star occurring due to a difference in the optical characteristics due to atmosphere dispersion, particularly, to the difference in the wavelength.

Referring to FIG. 3, reference numeral M1 represents a primary mirror comprising a concave hyperboloid, and LA represents an aberration correction system having lenses L1 to L4 to have an optical function serving as a prime focus corrector system for correcting various aberrations generated in the primary mirror M1, such as spherical aberration, comatic aberration and astigmatism and a atmosphere dispersion correction system for correcting the atmosphere dispersion.

A luminous flux from a celestial body is transmitted from a right portion of the drawing, made incident upon the primary mirror M1, reflected by the primary mirror M1, and focused by way of the aberration correction system LA. The lenses L1, L2 and L4 serve as a prime focus corrector system which mainly corrects the aberration caused by the primary mirror M1. The lens L3 serves as an atmosphere dispersion correction system for correcting the chromatic aberration of the prime focus corrector system and any atmosphere dispersion.

The lens L3 is a compound lens formed by bonding, with an adhesive agent or oil, lenses L31 and L32 which have the same refractive index (difference in the index of refraction is 0.01 or less), different dispersions (difference in the Abbe number is 20) and each has a spherical surface (they may be placed while leaving a slight air therebetween in place of bonding).

Specifically, the material of the lens L31 has a refractive index nd of 1.567322 and an Abbe number vd of 42.83, while that of the lens L32 has a refractive index nd of 1.569069 and an Abbe number vd of 71.30.

With reference to a direction in which the light beam travels in the lens L31 forming the compound lens L3 (applied to hereinbelow), the center of curvature of a lens surface L31a of the object side of the lens L31 and that of a lens surface L32b of the image side of the lens L32 coincide (concentric) on point C on the optical axis 14.

This embodiment is arranged in such a manner that the compound lens L3 is made rotatable around the point C and the compound lens L3 is displaced by a displacing mechanism (not illustrated) around the point C. As a result, separation in the spectrum of the image of a star occurs due to the atmosphere dispersion is corrected.

That is, the rotational angle of the compound lens L3 is adjusted to correspond to the degree of the atmosphere dispersion, which changes depending upon the zenith distance, so that deterioration in the focusing performance occurring due to the atmosphere dispersion is corrected. If the compound lens L3 is made to be the prime focus corrector system to improve the degree of freedom, and each of the lenses L1, L2 and L4 is made of borosilicate crown glass, a result is attained superior to the structure in which the conventional structure made of the phosphate fluor crown glass.

Since the lens L1 inevitably has a large aperture to serve as the prime focus corrector system, it is made of borosilicate crown glass as to be easily manufactured and machined as compared with the phosphate fluor crown glass. A lens surface L2b of the image side of the lens L2 and a lens surface L4a of the object side of the lens L4 are each formed by aspheric surfaces to improve the imaging performance. Symbol G represents a glass block serving as a window member for the observing sensor such as a CCD.

Since the aberration correction system according to this embodiment is formed as described above, the number of the optical elements (the number of the lenses) can be decreased to prevent the generation of ghost in the astronomical observation and luminous quantity loss. As a result, observation can satisfactorily be performed.

Figure 1:
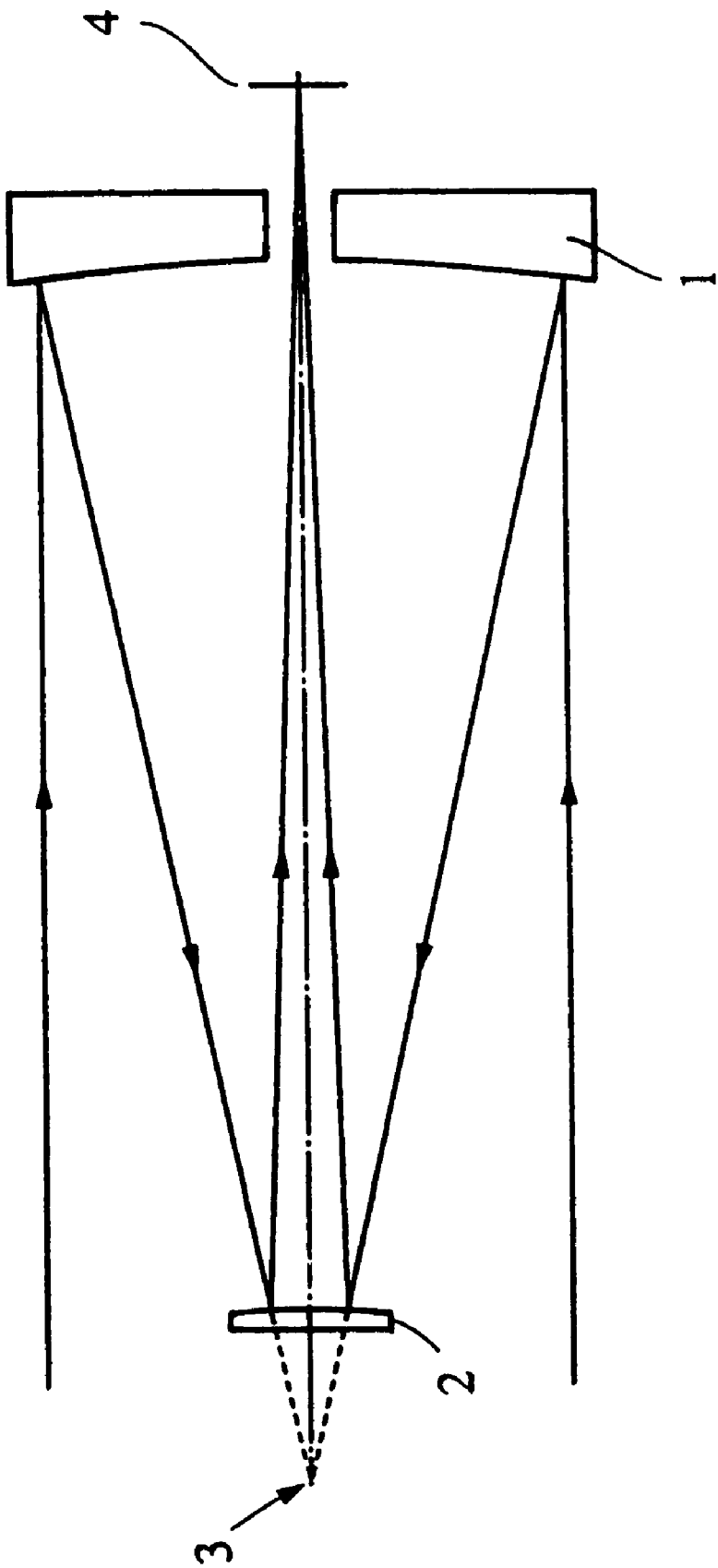
FIG. 1 is a schematic view which illustrates an essential portion of an optical system of a conventional Cassegrain telescope.
Figure 2:
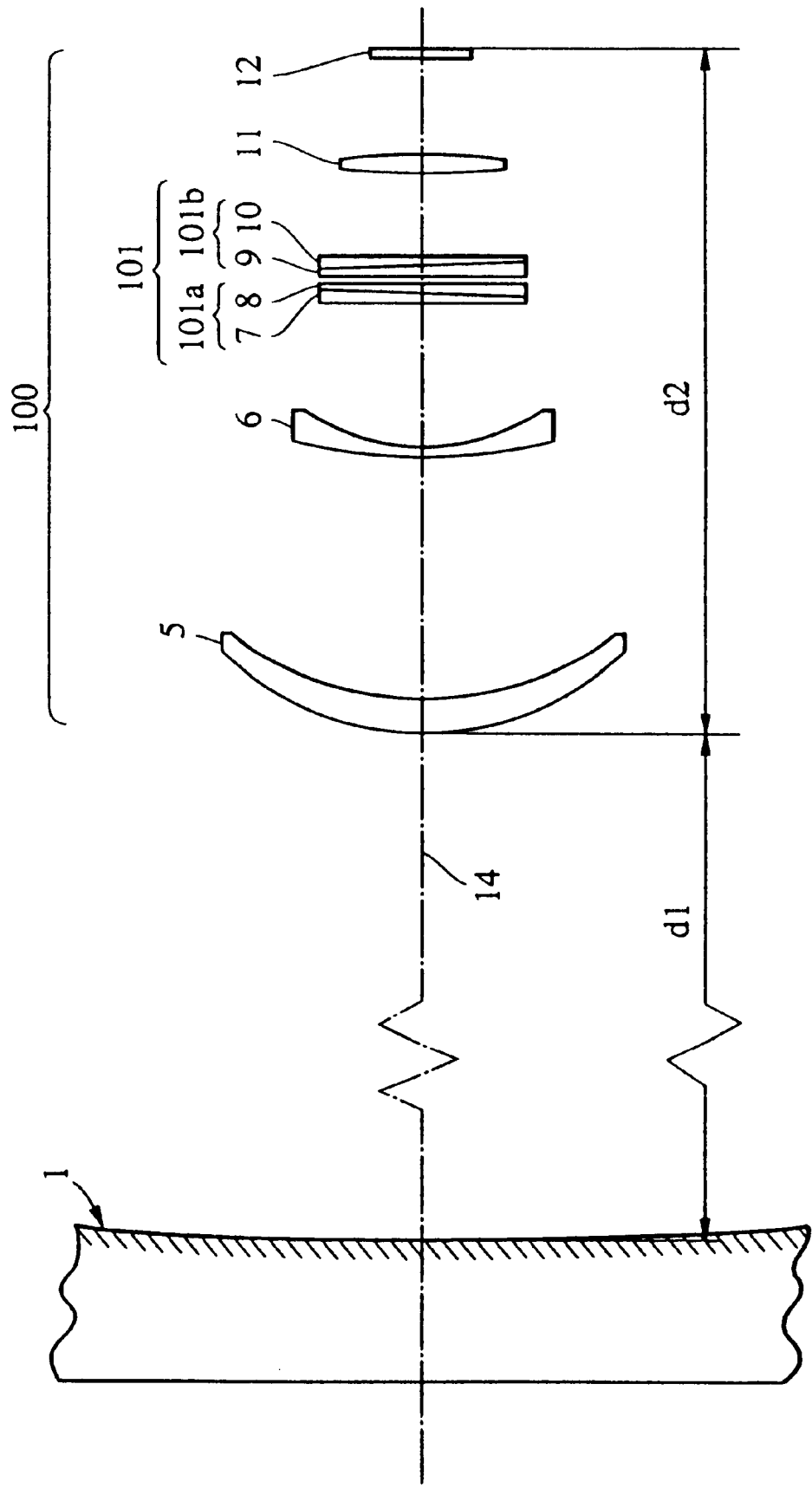
FIG. 2 is a schematic view which illustrates an essential portion of an optical system of a conventional telescope having a prime focus corrector system.

This embodiment is arranged in such a manner that the effective diameter of the lens L1 is 554 mm, the overall length of the system is 0.92 m so that the aperture is made to be 85% and the simple capacity ratio α (α=(aperture ratio)$^2$×overall length ratio) is about half of the lens of the conventional prime focus corrector system shown in FIG. 2 which has an effective diameter of 650 mm and an overall length of 1.2 m, as can be understood from the following equation:

$$\alpha = \left(\frac{554}{670}\right)^2 \times \frac{0.92}{1.2} = 0.524$$

Further, the number of the optical elements is decreased by one as compared with the conventional prime focus corrector system.

Figure 4:
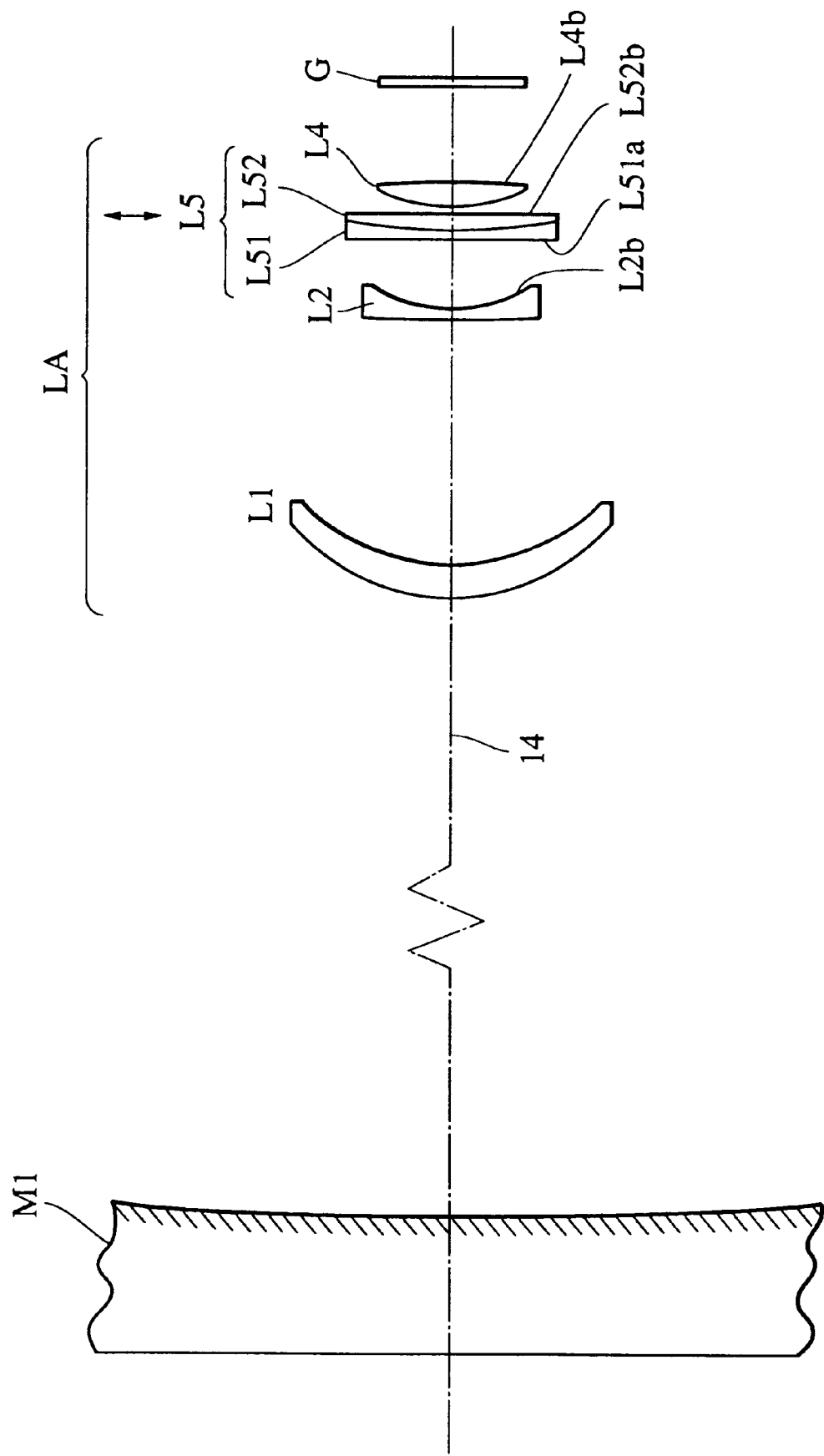
FIG. 4 is a schematic view which illustrates an essential portion of an optical system according to a second numerical example of the present invention.

FIG. 4 is a schematic view which illustrates an optical system according to a second embodiment of the present invention. FIGS. 7A–7G are graphs which illustrates various aberrations of the second embodiment of the present invention.

This embodiment differs from the first embodiment in that the structure and the method of the displacement of the compound lens L5 serves as the atmosphere dispersion correction system to correct the optical characteristics occurring due to the atmosphere dispersion. The residual structures are the same as the first embodiment.

The compound lens L5 is formed by joining lenses L51 and L52 made of materials having substantially the same refraction indexes and different dispersions, the lenses L51 and L52 each have an outer surface in contact with air which is a plane surface.

That is, the lens L51 has the lens surface L51a at the object side which is a plane surface, while the lens L52 has the lens surface L52b at the image side which is a plane surface. It can be considered that the lens surfaces L51a and L52b have a common curvature center at an infinite point. The compound lens L5 can be rotated around the common curvature center (can be translated). By moving the compound lens L5 in a direction perpendicular to the optical axis by a moving mechanism (not illustrated), chromatic deviation is corrected. The lens surface L2b of the image side of the lens L2 and the lens surface L4b of the image side of the lens L4 each have aspheric surfaces to improve the optical performance.

Figure 5:
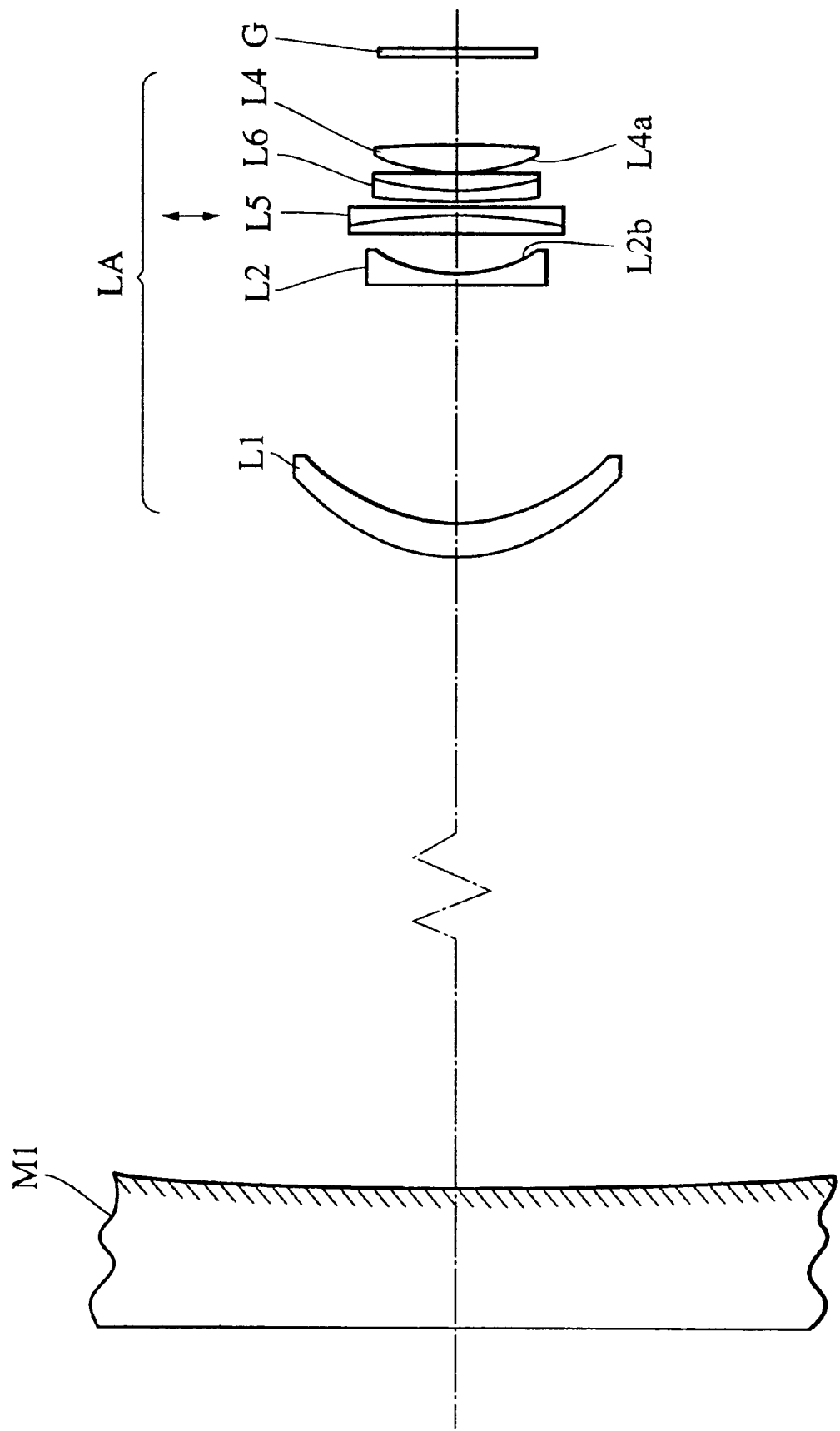
FIG. 5 is a schematic view which illustrates an essential portion of an optical system according to a third numerical example of the present invention.
Figures 8A, 8B, 8C:
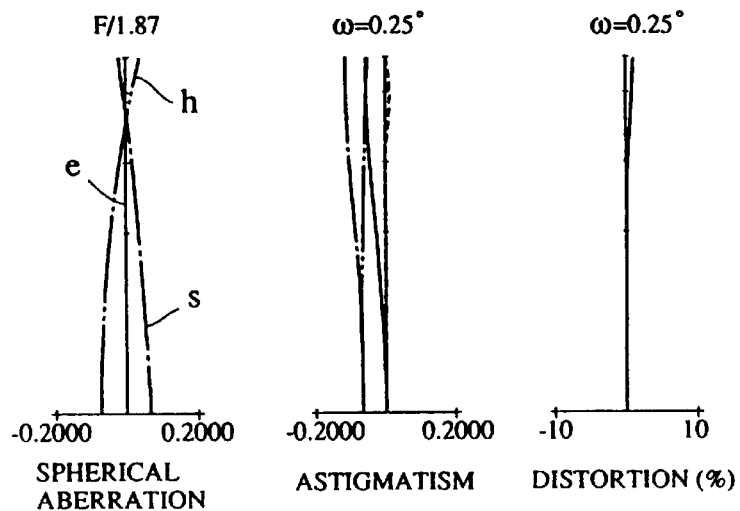
FIGS. 8A–8G are graphs of various aberrations according to the third numerical example of the present invention.
Figure 8D:
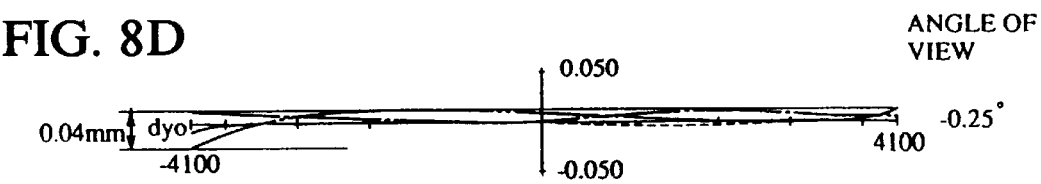
Figure 8E:
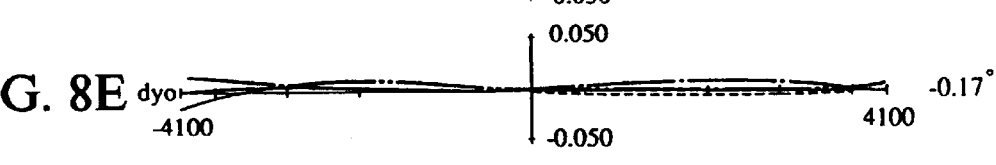
Figure 8F:
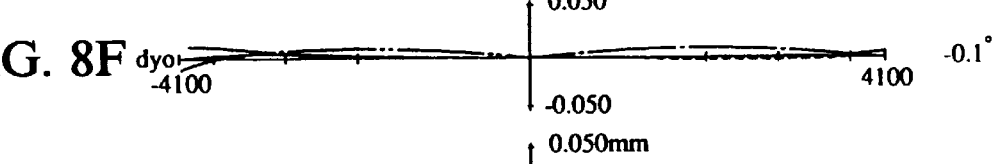
Figure 8G:
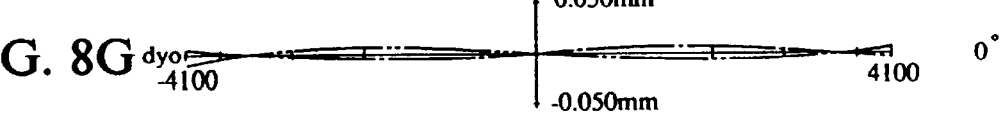

FIG. 5 is a schematic view which illustrates an optical system according to a third embodiment of the present invention. FIGS. 8A–8G are graphs which illustrates various aberrations according to the third embodiment of the present invention.

As contrasted with the second embodiment shown in FIG. 4, this embodiment is arranged in such a manner that a fixed compound lens L6 is disposed on the image side of the compound lens L5, the compound lens L5 serving as the atmosphere dispersion correction system. As a result, various aberrations such as chromatic spherical aberration and chromatic coma aberration are satisfactorily corrected while reducing the overall size of the lens system.

The aberration correction system according to the present invention may be applied to the Cassegrain telescope, a Newton telescope and another telescope as well as the RC telescope.

The numeral examples of the present invention will now be described. In the description of the examples, Ri is the curvature radius of the i th lens surface when counted from the object, Di is the thickness of the i th lens or the interval of the air when counted from the object, and Ni and vi of the Abbe number and the refractive index of the i th lens when counted from the object.

Assuming that the direction of the optical axis is X-axis, a direction perpendicular to the X-axis is H-axis, the direction in which light is transmitted is positive, R is a paraxial curvature radius, and B, C, D and E are each aspheric coefficients, the aspheric surface is expressed as follows:

$$X = \frac{(1/R)H^2}{1+\sqrt{1 \div (1+k)(H/R)^2}} + BH^4 + CH^6 + DH^8 + EH^{10}$$

Numerical Example 1
f = 15602.5 FNO = 1.93 2ω = 30'

| Effective Diameter | Ri | Di | Ni | vi |
|---|---|---|---|---|
| 1 | 8200.001 | 30000.00000 | 14127.00000 | 1.000000 | 0.00 |
| 2 | 553.532 | 388.46602 | 56.00000 | 1.516330 | 64.15 |
| 3 | 516.408 | 390.02138 | 428.40000 | 1.000000 | 0.00 |
| 4 | 297.839 | 1158.43358 | 16.00000 | 1.516330 | 64.15 |
| 5 | 274.172 | 251.27130 | 144.30000 | 1.000000 | 0.00 |
| 6 | 340.000 | −956.00000 | 14.00000 | 1.567322 | 42.83 |
| 7 | 340.000 | ∞ | 30.00000 | 1.569069 | 71.30 |
| 8 | 340.000 | −1000.00000 | 10.00000 | 1.000000 | 0.00 |
| 9 | 255.442 | 331.43254 | 41.00000 | 1.516330 | 64.15 |
| 10 | 251.258 | −1890.05289 | 165.00000 | 1.000000 | 0.00 |
| 11 | 250.000 | ∞ | 15.00000 | 1.516330 | 64.15 |
| 12 | 250.000 | ∞ | 1.00006 | 1.000000 | 0.00 |

Aspheric surface

R1  k = −1.00835   B = 0,   C = 0,   D = 0,   E = 0
R5  k = 0   B = −1.0857 × 10$^{-9}$,   C = −2.7514 × 10$^{-15}$
    D = 8.5727 × 10$^{-20}$,   E = −4.5254 × 10$^{-24}$
R9  k = 0   B = −2.0723 × 10$^{-9}$,   C = −2.0978 × 10$^{-16}$
    D = −5.1666 × 10$^{-19}$,   E = 3.6646 × 10$^{-24}$

Numerical Example 2
f = 15106.0 FNO = 1.84 2ω = 30'

| Effective Diameter | Ri | Di | Ni | vi |
|---|---|---|---|---|
| 1 | 8200.000 | 30000.00000 | 14139.51204 | 1.000000 | 0.00 |
| 2 | 545.594 | 374.63855 | 56.00000 | 1.516330 | 64.15 |
| 3 | 507.246 | 371.45054 | 444.06776 | 1.000000 | 0.00 |
| 4 | 286.646 | 4250.21858 | 16.00000 | 1.516330 | 64.15 |
| 5 | 264.059 | 241.35951 | 104.10300 | 1.000000 | 0.00 |
| 6 | 261.913 | ∞ | 15.00000 | 1.589206 | 41.08 |
| 7 | 261.408 | 900.00000 | 30.00000 | 1.589129 | 61.18 |
| 8 | 260.992 | ∞ | 10.00000 | 1.000000 | 0.00 |
| 9 | 259.783 | 313.20291 | 46.00000 | 1.569069 | 71.30 |
| 10 | 256.014 | −1160.86090 | 165.00000 | 1.000000 | 0.00 |
| 11 | 250.000 | ∞ | 15.00000 | 1.516330 | 64.15 |
| 12 | 250.000 | ∞ | | 1.000000 | 0.00 |

Aspheric surface

R1  $k = -1.00835$   $B = 0,$   $C = 0,$   $D = 0,$   $E = 0$
R5  $k = 0$   $B = -2.2973 \times 10^{-9},$   $C = -8.2569 \times 10^{-15}$
    $D = 2.0542 \times 10^{-19},$   $E = -1.1832 \times 10^{-23}$
R9  $k = 0$   $B = -3.0425 \times 10^{-9},$   $C = -6.5526 \times 10^{-15}$
    $D = 9.2017 \times 10^{-20},$   $E = -9.3266 \times 10^{-24}$ Numerical Example 3
f = 15312.98 FNO = 1.87 2ω = 30'

| Effective Diameter | Ri | Di | Ni | vi |
|---|---|---|---|---|
| 1 | 8200.001 | 30000.00000 | 14211.98754 | 1.000000 | 0.00 |
| 2 | 504.651 | 325.03089 | 56.00000 | 1.516330 | 64.15 |
| 3 | 465.142 | 318.86167 | 381.51365 | 1.000000 | 0.00 |
| 4 | 281.147 | 13552.38382 | 16.00000 | 1.516330 | 64.15 |
| 5 | 257.222 | 221.89367 | 68.26377 | 1.000000 | 0.00 |
| 6 | 340.000 | ∞ | 30.00000 | 1.603419 | 38.01 |
| 7 | 340.000 | −900.00000 | 14.00000 | 1.603112 | 60.70 |
| 8 | 340.000 | ∞ | 9.65481 | 1.000000 | 0.00 |
| 9 | 261.210 | 1202.74976 | 15.00000 | 1.620040 | 36.26 |
| 10 | 259.874 | 454.94325 | 30.07215 | 1.516330 | 64.15 |
| 11 | 259.759 | −5719.60207 | 1.00000 | 1.000000 | 0.00 |
| 12 | 258.411 | 297.48663 | 46.46515 | 1.496998 | 81.61 |
| 13 | 260.939 | −1235.65592 | 165.00000 | 1.000000 | 0.00 |
| 14 | 250.000 | ∞ | 15.00000 | 1.516330 | 64.15 |
| 15 | 250.000 | ∞ | | 1.000000 | 0.00 |

Aspheric surface

R1  $k = -1.00835$   $B = 0,$   $C = 0,$   $D = 0,$   $E = 0$
R5  $k = 0$   $B = -9.2431 \times 10^{-10},$   $C = 1.0334 \times 10^{-19}$
    $D = 1.6536 \times 10^{-19},$   $E = 2.8329 \times 10^{-29}$
R12 $k = 0$   $B = 5.7514 \times 10^{-10},$   $C = 3.3456 \times 10^{-14}$
    $D = 9.7217 \times 10^{-19},$   $E = 1.3405 \times 10^{-23}$ Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. An atmospheric dispersion correction lens system comprising, in order from a light entrance side to a light exit side, a first lens and a second lens,
   wherein the difference in the Abbe numbers of said first and second lenses is at least 20 and the refractive indexes of said first and second lenses differ by 0.01 or less,
   wherein said first lens has a spherical surface on the light entrance side and said second lens has a spherical surface on the light exit side, and the spherical surfaces have a substantially common center of curvature, and
   wherein said first and second lenses are rotatable as a unit around the common center of curvature to adjust a tilt angle of an optical axis of said first and second lenses with respect to an optical axis of said aberration correction system so as to correct a deviation of an image occurring due to the atmospheric dispersion.

2. An atmospheric dispersion correction lens system according to claim 1, wherein said first and second lenses are cemented together.

3. An atmospheric dispersion correction lens system according to claim 1, wherein said first and second lenses are separated by an air gap.

4. An atmospheric dispersion correction lens system according to claim 1, wherein said first lens has a refractive index of 1.567322 and an Abbe number of 42.83, and said second lens has a refractive index of 1.569069 and an Abbe number of 71.30.

5. An atmospheric dispersion correction lens system according to claim 1, wherein the spherical surface of said first lens is concave to the light entrance side and the spherical surface of said second lens is convex to the light exit side.

6. An atmospheric dispersion correction lens system comprising, in order from a light entrance side to a light exit side, a first lens and a second lens,
   wherein the difference in the Abbe numbers of said first and second lenses is at least 20 and the refractive indexes of said first and second lenses differ by 0.01 or less,
   wherein the surface of the light entrance side of said first lens and the surface of the light exit side of said second lens are plane surfaces which are perpendicular to the optical axis of said atmospheric dispersion correction lens system, and
   wherein said first and second lenses are translatable as a unit in a direction perpendicular to the optical axis of said atmospheric dispersion correction lens system to adjust an amount of decentering of said first and second lenses with respect to the optical axis of said atmospheric dispersion correction lens system so as to correct a deviation of an image occurring due to atmospheric dispersion.

7. An atmospheric dispersion correction lens system according to claim 6, wherein said first and second lenses are cemented together.

8. An atmospheric dispersion correction lens system according to claim 6, wherein said first and second lenses are separated by an air gap.

9. An astronomical telescope comprising:
   a concave reflecting mirror; and
   an atmospheric dispersion correction lens system, comprising, in order from a light entrance side to a light exit side, a first lens and a second lens, wherein the light entrance side is the side from which the light is reflected by said concave reflecting mirror and the light exit side is the other side,
   wherein the difference in the Abbe numbers of said first and second lenses is at least 20 and the refractive indexes of said first and second lenses differ by 0.01 or less,
   wherein said first lens has a spherical surface on the light entrance side and said second lens has a spherical surface on the light exit side, and the spherical surfaces have a substantially common center of curvature, and wherein said first and second lenses are rotatable as a unit around the common center of curvature to adjust a tilt angle of an optical axis of said first and second lenses with respect to an optical axis of said aberration correction system so as to correct a deviation of an image occurring due to the atmospheric dispersion.

10. An astronomical telescope according to claim 9, wherein said first and second lenses are cemented together, wherein the spherical surface of said first lens is concave to the light entrance side and the spherical surface of said second lens is convex to the light exit side, and wherein said astronomical telescope comprises in adjacent order from the light entrance side to the light exit, after said concave reflecting mirror:

(a) a meniscus positive lens having a convex surface facing the object side;

(b) a meniscus negative lens and having a convex surface facing the light entrance side;

(c) said atmospheric dispersion correction lens system; and (d) a biconvex positive lens.

11. An astronomical telescope according to claim 10, wherein said lenses (a), (b), and (d) are fixed and are made of borosilicate crown glass.

12. An astronomical telescope according to claim 11, wherein said lens (b) has an aspherical concave surface on the light exit side and said lens (d) has an aspherical surface on the light entrance side.

13. An astronomical telescope according to claim 12, wherein said first lens has a refractive index of 1.567322 and an Abbe number of 42.6, and said second lens has a refractive index of 1.569069 and an Abbe number of 71.30.

14. An astronomical telescope comprising:

a concave reflecting mirror; and an atmospheric dispersion correction lens system, comprising, in order from a light entrance side to a light exit side, a first lens and a second lens, wherein the light entrance side is the side from which the light is reflected by said concave reflecting mirror and the light exit side is the other side, wherein the difference in the Abbe numbers of said first and second lenses is at least 20 and the refractive indexes of said first and second lenses differ by 0.01 or less, wherein the surface of the light entrance side of said first lens and the surface of the light exit side of said second lens are plane surfaces which are perpendicular to the optical axis of said atmospheric dispersion correction lens system, and wherein said first and second lenses are translatable as a unit in a direction perpendicular to the optical axis of said atmospheric dispersion correction lens system to adjust an amount of decentering of said first and second lenses with respect to the optical axis of said atmospheric dispersion correction lens system so as to correct a deviation of an image occurring due to atmospheric dispersion.

15. An astronomical telescope according to claim 14, wherein said first and second lenses are cemented together.

16. An astronomical telescope according to claim 14, wherein said first and second lenses are separated by an air gap.

17. An astronomical telescope comprising:

a concave reflecting mirror; and an aberration correction optical system for correcting aberrations generated by said concave reflecting mirror, said optical system including an atmospheric dispersion correction lens system comprising, in order from a light entrance side to a light exit side, a first lens and a second lens, wherein the light entrance side is the side from which the light is reflected by said concave reflecting mirror and the light exit side is the other side, wherein the difference in the Abbe numbers of said first and second lenses is at least 20 and the refractive indexes of said first and second lenses differ by 0.01 or less, wherein said first lens has a spherical surface on the light entrance side and said second lens has a spherical surface on the light exit side, and the spherical surfaces have a substantially common center of curvature, and wherein said first and second lenses are rotatable as a unit around the common center of curvature to adjust a tilt angle of an optical axis of said first and second lenses with respect to an optical axis of said aberration correction system so as to correct a deviation of an image occurring due to the atmospheric dispersion.

18. An astronomical telescope according to claim 17, wherein said first and second lenses are cemented together, wherein the spherical surface of said first lens is concave to the light entrance side and the spherical surface of said second lens is convex to the light exit side, and wherein said astronomical telescope comprises in adjacent order from the light entrance side to the light exit, after said concave reflecting mirror:

(a) a meniscus positive lens having a convex surface facing the object side;

(b) a meniscus negative lens and having a convex surface facing the light entrance side;

(c) said atmospheric dispersion correction lens system; and (d) a biconvex positive lens.

19. An astronomical telescope according to claim 18, wherein said lenses (a), (b), and (d) are fixed and are made of borosilicate crown glass.

20. An astronomical telescope according to claim 19, wherein said lens (b) has an aspherical concave surface on the light exit side and said lens (d) has an aspherical surface on the light entrance side.

21. An astronomical telescope according to claim 20, wherein said first lens has a refractive index of 1.567322 and an Abbe number of 42.6, and said second lens has a refractive index of 1.569069 and an Abbe number of 71.30.

22. An astronomical telescope according to claim 17, wherein said atmospheric dispersion correction lens system consists of said first lens and said second lens.

23. An astronomical telescope comprising:

a concave reflecting mirror; and an aberration correction optical system for correcting aberrations generated by said concave reflecting mirror, said optical system including an atmospheric dispersion correction lens system comprising, in order from a light entrance side to a light exit side, a first lens and a second lens, wherein the light entrance side is the side from which the light is reflected by said concave reflecting mirror and the light exit side is the other side, wherein the difference in the Abbe numbers of said first and second lenses is at least 20 and the refractive indexes of said first and second lenses differ by 0.01 or less, wherein the surface of the light entrance side of said first lens and the surface of the light exit side of said second lens are plane surfaces which are perpendicular to the optical axis of said atmospheric dispersion correction lens system, and wherein said first and second lenses are translatable as a unit in a direction perpendicular to the optical axis of said atmospheric dispersion correction lens system to adjust an amount of decentering of said first and second lenses with respect to the optical axis of said atmospheric dispersion correction lens system so as to correct a deviation of an image occurring due to atmospheric dispersion.

24. An astronomical telescope according to claim 23, wherein said first and second lenses are cemented together.

25. An astronomical telescope according to claim 23, wherein said first and second lenses are separated by an air gap.

26. An astronomical telescope according to claim 23, wherein said atmospheric dispersion correction lens system consists of said first lens and said second lens.

* * * * *

UNITED STATES PATENT AND TRADEMARK OFFICE
CERTIFICATE OF CORRECTION

PATENT NO. : 6,038,068
DATED : March 14, 2000
INVENTOR(S) : Kunio TAKESHI, et al.

It is certified that error appears in the above-identified patent and that said Letters Patent is hereby corrected as shown below:

ON THE COVER PAGE:

AT [57] Abstract:

Line 8, "center" should read --common center--.

COLUMN 4:

Line 60, "occurs" should read --that occurs--.

COLUMN 5:

Line 18, "ghost" should read --ghosts--.

COLUMN 9:

Line 31, "42.6" should read --42.83--.

UNITED STATES PATENT AND TRADEMARK OFFICE
CERTIFICATE OF CORRECTION

PATENT NO. : 6,038,068

DATED : March 14, 2000

INVENTOR(S) : Kunio TAKESHI, et al.

Page 2 of 2

It is certified that error appears in the above-identified patent and that said Letters Patent is hereby corrected as shown below:

COLUMN 10:

Line 45, "42.6" should read --42.83--.

Signed and Sealed this

Twenty-fourth Day of April, 2001

Attest:

NICHOLAS P. GODICI

Attesting Officer

Acting Director of the United States Patent and Trademark Office